United States Patent Office 3,359,822
Patented Dec. 26, 1967

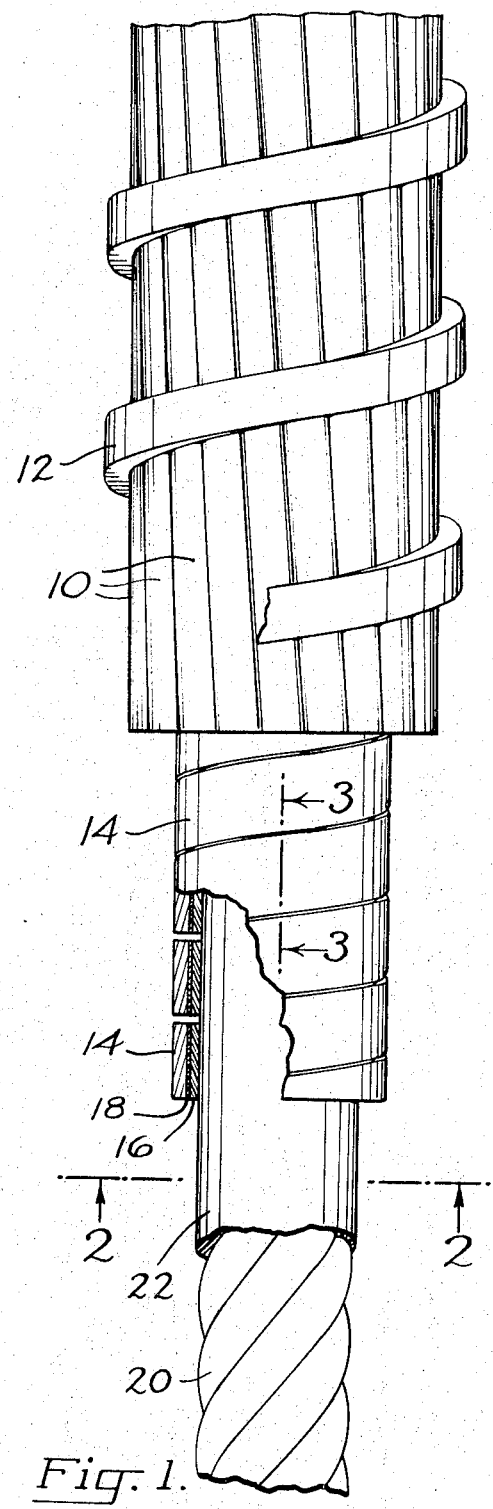
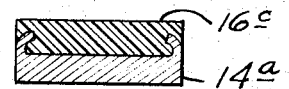
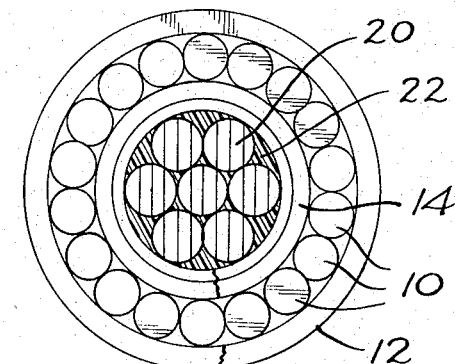
John B. Hurlow
INVENTOR

3,359,822
PUSH-PULL CABLE WITH PLASTIC
LINED SHEATH
John B. Hurlow, 2616 West Parkway,
Tacoma, Wash. 98466
Filed Dec. 13, 1965, Ser. No. 513,230
7 Claims. (Cl. 74—501)

This invention relates to push-pull cables of the class employed for controlling apparatus from a remote station.

Push-pull cables are known which consist of a core slidably received in a sheath, the core or sheath being coated with a plastic material designed to reduce friction and improve the operation of the cable.

The known cables of this class are characterized by the disadvantage, however, that the plastic elements do not have adequate inherent stiffness to make the cable sufficiently positive in its operation.

Also, although such cables are to a degree self-lubricating, it frequently is necessary to supplement the inherent lubricating qualities of the plastic with added lubricant, in which case the lubricant is wiped out of the bearing areas of the core and sheath by the movement of the former in the latter and hence does not serve its purpose.

It is the general object of the present invention to provide a push-pull cable in which the foregoing deficiencies are remedied and which is positive in its operation, not subject to length variation with applied load, and lubricated easily and effectively.

In the drawings:

FIG. 1 is a fragmentary plan view of the push-pull cable of the invention, with the various component layers stripped away and partly in section, better to show the interior construction;

FIG. 2 is a transverse sectional view taken along line 2—2 of FIG. 1;

FIGS. 3, 4, 5 and 6 are schematic views in transverse section, taken along line 3—3 of FIG. 2, illustrating alternate types of liners which may be employed in the push-pull cable of FIGS. 1 and 2.

The basic construction of the push-pull cable assembly of the present invention is as follows:

A core member adapted to transmit tension and compression forces slidably is received in a sheath comprising four principal elements: first, at least one sheath wire wrapped in a helix, second, a lining support wire wrapped in a helix and disposed within the sheath wire; third, a lining strip of thin plastic wrapped in a helix and disposed within the lining support wire; and fourth, interengaging means for securing the plastic lining strip in fixed operative position with relation to the lining support wire.

The lining support wire reinforces and stiffens the plastic lining strip which it mounts, thereby making the cable more positive in its action and reducing its tendency to vary in length with applied load. Also, the presence of a helically wound plastic lining strip, in contradistinction to a smooth plastic tube, provides a multiplicity of grooves and pockets in which applied lubricant can lodge, assuring that the lubricant will reach and lubricate effectively all of the cable bearing surfaces. In this way the principal objects of the invention are achieved.

Considering the foregoing in greater detail and with particular reference to the drawings:

In the form of the invention illustrated in FIGS. 1, 2 and 3, the sheath component of the presently described push-pull cable comprises a multiplicity of steel or other metallic stranding wires 10 laid side by side and wrapped helically with a long pitch. Stranding wires 10 are held in place by means of a binding wire 12 wrapped tightly about them in a helix of spaced coils of relatively short pitch.

A composite lining member is received within the sheath. It consists of two elements, a lining support wire 14 and a strip of thin plastic 16 suitably secured to the lining wire.

Lining support wire 14 comprises a length of wire, preferably flat wire wrapped in a tight helix of short pitch. Although the coils of the helix are close together, they neverthless are separated by a short distance, as shown in FIG. 1.

Lining strip 16 comprises a strip of thin plastic, preferably a plastic having outstanding qualities of abrasion resistance and self-lubrication. Suitable plastics thus comprise polymerized hexamethylenediamine adipamide (nylon), polytetrafluoroethylene (Teflon) and polyethylene.

The thickness of the plastic strip is variable depending upon the dimensions and application of the cable. However, where the width and thickness of lining support wire 14 are of the order of .125 inch and .032 inch respectively, the thickness of plastic lining strip 16 may be of the order of .005 to .010 inch.

Plastic lining strip 16 is arranged with reference to lining support wire 14 in such a manner that the coils of the strip lie closely adjacent the coils of the support wire, and in substantial registration therewith. Securing means then are provided for interengaging these two members of the composite liner to each other in fixed operative relation. Several types of securing means may be employed for this purpose.

In the type illustrated in FIGS. 1 and 2, the securing means comprises a film of adhesive 18, applied by roll coating or otherwise at the time the cable components are being assembled. Any suitable type of adhesive capable of bonding plastic to metal may be used for this purpose.

In the embodiment of FIG. 4 the plastic lining strip is formed with integral interengaging means. In this form of the invention, the plastic lining strip 16a is formed with a downwardly extending flange which extends along the side of lining support wire 14 and into the space noted above which is present between adjacent coils of the lining support wire. The plastic strip thus is locked in place. Manufacture of this form of the invention may be expedited by applying a temporary or permanent adhesive to the interface between the lining support wire and the plastic lining strip, to bind the one to the other until the coiling operation interengages them.

The form of the invention illustrated in FIG. 5 is similar, except that a plastic strip 16b is provided which has down-turned margins or flanges on both longitudinal side edges. This forms an even more positive interlock between the two elements. In manufacture, the plastic strip may be glued to the support wire, either temporarily or permanently as described above. In the alternative, the plastic strip may be sintered to shrink it so that the depending flanges will press against the side walls of wire 14, holding the strip in place.

In the form of the invention illustrated schematically in FIG. 6, tongue and groove members are employed to secure the plastic strip to the underlying support wire.

To this end, the longitudinal side edges of a support wire 14a are formed with upstanding tongues, and the longitudinal side edges of plastic lining strip 16c are formed with corresponding grooves. During manufacture, the sides of the support wire may be rolled to bend them into the grooves in the plastic strip, thereby securing the plastic strip to the support wire. Numerous other tongue and groove applications also may be employed.

Slidably received within the sheath thus comprised is a suitable sliding member, or core, adapted to transmit tension and compressive forces as is usual in push-pull cable assemblies.

The core may be variously constituted. Thus it may comprise a length of flexible heavy wire. In the alternative, it may comprise a flexible core 20 in the form of a stranded cable of steel or other metallic wires. If desired, the stranded wires may be armored with a plastic overlayment 22 which may to advantage comprise polytetrafluoroethylene (Teflon) because of its desirable self-lubricating and wear qualities.

The plastic overlayment may be extruded about the wire strand core so that the softened plastic flows around and between the strands, locking them together in their preferred arrangement. This forms a long wearing armored core which can not be disarranged by the application of either tension or compression forces within the limits of strength of the materials employed.

There thus is provided a push-pull control cable in which the core element moves freely within a plastic-lined sheath. Movement of the core member within the sheath may be facilitated, where desirable or necessary, by the application of a selected lubricant. This collects in the multiplicity of reservoirs formed by the spaces between the coils of plastic lining strip 16 and insures that lubricant always will be present in the areas of the bearing surfaces. In addition, helically coiled wire 14 supports plastic strip 16, rendering the unit more positive in its operation and less subject to length variation with load.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:
1. A push-pull cable assembly comprising
   (a) a sheath comprising
      (1) at least one sheath wire wrapped in a helix
      (2) a lining support wire wrapped in a helix and disposed within the sheath wire,
      (3) a lining strip of thin plastic wrapped in a helix disposed within the lining support wire,
      (4) the turns of the plastic lining strip helix being immediately adjacent and in substantial registration with the turns of the lining support wire helix,
      (5) interengaging means for securing the plastic lining strip in operative position with relation to the lining support wire, and
   (b) an elongated core member adapted to transmit tension and compression forces mounted within the sheath with its outer surface in sliding contact with the inner surface of the plastic lining strip.

2. The push-pull cable assembly of claim 1 wherein the plastic lining strip comprises polymerized hexamethylenediamine adipamide, providing a low friction sliding contact between the core member and the plastic lining strip.

3. The push-pull cable assembly of claim 1 wherein the plastic lining strip comprises polymerized polytetrafluoroethylene, providing a low friction sliding contact between the core member and the plastic lining strip.

4. The push-pull cable assembly of claim 1 wherein the plastic lining strip comprises polymerized polyethylene, providing a low friction sliding contact between the core member and the plastic lining strip.

5. The push-pull cable assembly of claim 1 wherein the interengaging means comprises an adhesive adherently uniting the plastic lining strip to the lining support wire.

6. The push-pull cable assembly of claim 1 wherein the plastic lining strip is provided with at least one downturned side edge received in the spaces between the helical turns of the lining support wire, thereby securing the plastic lining strip to the lining support wire.

7. The push-pull cable assembly of claim 1 wherein the elongated core member comprises a cluster of intertwined wire strands armored with a fused flexible plastic overlayment.

References Cited

UNITED STATES PATENTS

| | | | |
|---|---|---|---|
| 1,281,557 | 10/1918 | Goodall | 138—133 |
| 2,821,092 | 1/1958 | Cordora et al. | 74—501 |
| 2,918,808 | 12/1959 | Botti | 74—501 X |
| 3,093,162 | 6/1963 | Reiling | 138—134 X |
| 3,135,130 | 6/1964 | Bentley | 74—501 X |
| 3,176,538 | 4/1965 | Hurlow | 74—501 |
| 3,190,084 | 6/1965 | Moon et al. | 74—501 X |
| 3,214,995 | 11/1965 | Gilmore | 62—2 X |
| 3,238,808 | 3/1966 | Barnard | 74—501 |

FRED C. MATTERN, JR., *Primary Examiner.*

C. F. GREEN, *Assistant Examiner.*